US008564582B2

(12) United States Patent
Yamashita et al.

(10) Patent No.: US 8,564,582 B2
(45) Date of Patent: Oct. 22, 2013

(54) DISPLAY DEVICE, DRIVING METHOD THEREFOR, AND ELECTRONIC APPARATUS

(75) Inventors: Junichi Yamashita, Tokyo (JP); Katsuhide Uchino, Kanagawa (JP)

(73) Assignee: Sony Corporation, Tokyo (JP)

( * ) Notice: Subject to any disclaimer, the term of this patent is extended or adjusted under 35 U.S.C. 154(b) by 1385 days.

(21) Appl. No.: 12/076,157

(22) Filed: Mar. 14, 2008

(65) Prior Publication Data

US 2008/0238909 A1 Oct. 2, 2008

(30) Foreign Application Priority Data

Mar. 26, 2007 (JP) ................................ 2007-078218

(51) Int. Cl.
*G06F 3/038* (2013.01)
*G09G 5/00* (2006.01)

(52) U.S. Cl.
USPC ................ 345/211; 345/87; 345/88; 345/90; 345/94; 345/204

(58) Field of Classification Search
None
See application file for complete search history.

(56) References Cited

U.S. PATENT DOCUMENTS

2006/0170628 A1* 8/2006 Yamashita et al. .............. 345/76

FOREIGN PATENT DOCUMENTS

| | | |
|---|---|---|
| JP | 2003-255856 | 9/2003 |
| JP | 2003-271095 | 9/2003 |
| JP | 2004-029791 | 1/2004 |
| JP | 2004-093682 | 3/2004 |
| JP | 2004-133240 | 4/2004 |
| JP | 2006038963 A * | 2/2006 |
| JP | 2006-215213 | 8/2006 |
| JP | 2007-034001 A | 2/2007 |

OTHER PUBLICATIONS

Japanese Office Action issued Mar. 22, 2012 for corresponding Japanese Application No. 2007-078218.

* cited by examiner

*Primary Examiner* — Sumati Lefkowitz
*Assistant Examiner* — Jesus Hernandez
(74) *Attorney, Agent, or Firm* — Rader, Fishman & Grauer PLLC

(57) ABSTRACT

A display device includes a pixel array and a drive unit that drives the pixel array. The pixel array includes first and second scanning lines in rows, signal lines in columns, a matrix of pixels arranged at respective intersections of the scanning lines and the signal lines, power supply lines that supply power to each of the pixels, and ground lines. The drive unit includes a first scanner that sequentially supplies first control signals to the corresponding first scanning lines to perform line-sequential scanning on the pixels on a row-by-row basis, a second scanner that sequentially supplies second control signals to the corresponding second scanning lines in synchronization with the line-sequential scanning, and a signal selector that supplies video signals to the signal lines in synchronization with the line-sequential scanning. Each pixel includes a light-emitting element, a sampling transistor, a drive transistor, a switching transistor, and a pixel capacitor.

9 Claims, 13 Drawing Sheets

$$Ids = k\mu(Vgs - Vth)^2 = k\mu(Vsig - \Delta V)^2$$

DISPLAY DEVICE, DRIVING METHOD THEREFOR, AND ELECTRONIC APPARATUS

CROSS REFERENCES TO RELATED APPLICATIONS

The present invention contains subject matter related to Japanese Patent Application JP 2007-078218 filed in the Japanese Patent Office on Mar. 26, 2007, the entire contents of which are incorporated herein by reference.

BACKGROUND OF THE INVENTION

1. Field of the Invention

The present invention relates to a display device for displaying an image by current-driving light-emitting elements disposed to its respective pixels, to a driving method for the display device and to an electronic apparatus including the display device. More specifically, the present invention relates to a driving method for an active matrix display device in which the current passing through a light-emitting element, such as an organic electroluminescent (EL) element, is controlled by an insulated-gate field-effect transistor in each pixel circuit.

2. Description of the Related Art

An example of such display device is a liquid crystal display in which many liquid crystal pixels are arranged in a matrix. According to image information, the liquid crystal display controls the intensity of light transmitted through or reflected by each of the pixels, and thus displays an image corresponding to the image information. An organic EL display, including organic EL elements as pixels, has a mechanism similar to that of the liquid crystal display described above. However, unlike the liquid crystal pixels of the liquid crystal display, the organic EL elements of the organic EL display are self-luminous. Therefore, the organic EL display has advantages over the liquid crystal display in that it provides better viewability, requires no backlight, and has a higher response speed. Additionally, the organic EL display is very different from the liquid crystal display in that, unlike the liquid crystal display, which is a voltage-controlled display, the organic EL display is a current-controlled display in which the luminance (gradation) of each light-emitting element is controllable by the value of a current flowing therethrough.

As in the case of the liquid crystal display, there are two types of driving methods for the organic EL display: a simple matrix type and an active matrix type. Although a simple-matrix display is simple in structure, it has problems in its large size and its difficulty achieving high definition display. Therefore, current efforts are primarily directed toward the development of active-matrix displays. In an active-matrix display, a current flowing through a light-emitting element in each pixel circuit is controlled by an active element (typically a thin-film transistor or TFT) disposed in the pixel circuit (see, for example, Japanese Unexamined Patent Application Publications Nos. 2003-255856, 2003-271095, 2004-133240, 2004-029791, 2004-093682, and 2006-215213).

SUMMARY OF THE INVENTION

Pixel circuits of the related art are arranged in respective intersections of rows of scanning lines for supplying control signals and columns of signal lines for supplying video signals. Each pixel circuit includes at least a sampling transistor, a pixel capacitor, a drive transistor, and a light-emitting element. In response to a control signal supplied from a scanning line, the sampling transistor is brought into conduction and samples a video signal supplied from a signal line. The pixel capacitor holds an input voltage corresponding to a signal potential of the sampled video signal. According to the input voltage held by the pixel capacitor, the drive transistor supplies an output current as a drive current during a predetermined light-emitting period. Generally, the output current is dependent on carrier mobility and threshold voltage in a channel region of the drive transistor. In response to the output current supplied from the drive transistor, the light-emitting element emits light at an intensity corresponding to the video signal.

The drive transistor receives, the input voltage held in the pixel capacitor at the gate thereof, causing the output current to flow between the source and drain thereof, and energizes the light-emitting element. Generally, the intensity of light emitted from the light-emitting element is proportional to the amount of current flowing therethrough. The amount of output current supplied from the drive transistor is controlled by the gate voltage, that is, by the input voltage written to the pixel capacitor. The pixel circuit of the related art controls the amount of current supplied to the light-emitting element by varying the input voltage applied to the gate of the drive transistor according to the input video signal.

The operating characteristic of the drive transistor can be expressed by Equation 1 as follows:

$$Ids=(1/2)\mu(W/L)Cox(Vgs-Vth)^2 \quad \text{Equation 1}$$

where Ids represents the drain current flowing between the source and drain of the drive transistor, the drain current being the output current supplied to the light-emitting element in the pixel circuit; Vgs represents the gate voltage applied to the gate with respect to the source with the gate voltage being the above-described input voltage in the pixel circuit; Vth represents the threshold voltage of the transistor; μ represents the mobility of a semiconductor thin film serving as a channel of the transistor; W represents the channel width; L represents the channel length; and Cox represents the gate capacitance. As can be seen from Equation 1 above, when the TFT operates in a saturation region, if the gate voltage Vgs increases to exceed the threshold voltage Vth, the transistor is turned on and causes the drain current Ids to flow. In principle, as indicated by Equation 1, if the gate voltage Vgs is constant, the drain current Ids is supplied at a constant rate to the light-emitting element. Therefore, if video signals of the same level are supplied to respective pixels of the screen, all the pixels should emit light at the same intensity, thus achieving luminance uniformity over the screen.

In practice, however, there are variations in device characteristics among TFTs which are made of semiconductor thin films, such as polysilicon films. In particular, the threshold voltage Vth is not constant and varies from pixel to pixel. As can be seen from Equation 1 above, even if the gate voltage Vgs is constant, variations in threshold value Vth among drive transistors cause variations in drain current Ids and the luminance from pixel to pixel, thus degrading the luminance uniformity over the screen. There has been pixel circuits developed having a function of canceling variations in threshold voltage among drive transistors. An example is disclosed in Japanese Unexamined Patent Application Publication No. 2004-133240.

However, variations in output current to the light-emitting element are not only caused by variations in threshold voltage Vth among drive transistors. As can be seen from Equation 1 described above, the output current Ids varies if the mobility μ varies among drive transistors. As a result, the uniformity of luminance over the screen is degraded. There has been pixel circuits developed having a function of correcting variations in mobility among drive transistors. An example is disclosed in Japanese Unexamined Patent Application Publication No. 2006-215213.

In a pixel circuit having the mobility correcting function of related art, a drive current that flows through a drive transistor according to a signal potential is supplied to a pixel capacitor through negative feedback during a predetermined correction period. Thus, the signal potential stored in the pixel capacitor is adjusted. If the mobility of the drive transistor is high, the amount of negative feedback is large. In this case, the signal potential is greatly reduced, thus suppressing the drive current. On the other hand, if the mobility of the drive transistor is low, the amount of negative feedback to the pixel capacitor is small. In this case, since the stored signal potential is not greatly reduced, there is no significant reduction in drive current. Thus, depending on the level of mobility of the drive transistor in each pixel, the signal potential is adjusted in the direction of canceling it. Therefore, even if the mobility of the drive transistor varies from pixel to pixel, the pixels exhibit substantially the same level of light-emitting luminance with respect to the same signal potential.

The mobility correction described above is performed during a predetermined mobility correction period. If the mobility correction period varies from pixel to pixel, the amount of negative feedback also varies, thus performing accurate mobility correction becomes difficult. The mobility correction period is determined by on/off controlling the sampling transistor and the switching transistor according to a predetermined sequence. However, the phase of a control signal (gate pulse) for on/off controlling these transistors is not necessarily constant and fluctuates to some extent. This causes the mobility correction period to vary from pixel to pixel, which is a problem to be solved.

With the technical disadvantage of the related art described above, it is desirable to provide a display device and a driving method for the display device capable of precisely controlling the period of correcting the mobility of a drive transistor. More specifically, it is desirable to suppress variations in mobility correction period, thereby enhancing the uniformity of luminance over the screen of the display device. A display device, according to an embodiment of the present invention, includes a pixel array and a drive unit configured to drive the pixel array. The pixel array includes a plurality of first scanning lines and second scanning lines arranged in rows, a plurality of signal lines arranged in columns, a matrix of pixels arranged at respective intersections of the scanning lines and the signal lines, a plurality of power supply lines that supply power to each of the pixels, and a plurality of ground lines. The drive unit includes a first scanner that sequentially supplies first control signals to the corresponding first scanning lines to perform line-sequential scanning on the pixels on a row-by-row basis; a second scanner that sequentially supplies second control signals to the corresponding second scanning lines in synchronization with the line-sequential scanning; and a signal selector that supplies video signals to the columns of signal lines in synchronization with the line-sequential scanning. Each of the pixels includes a light-emitting element, a sampling transistor, a drive transistor, a switching transistor, and a pixel capacitor. A gate of the sampling transistor is connected to one of the first scanning lines, the source of the sampling transistor is connected to one of the signal lines, and the drain of the sampling transistor is connected to the gate of the drive transistor. The drive transistor and the light-emitting element are connected in series between one of the power supply lines and one of the ground lines to form a current path. The switching transistor is disposed in the current path and a gate of the switching transistor is connected to one of the second scanning lines. The pixel capacitor is disposed between the source and gate of the drive transistor. The sampling transistor is turned on in response to a first control signal supplied from the first scanning line, samples a signal potential of a video signal supplied from the signal line, and stores the sampled signal potential in the pixel capacitor. The switching transistor is turned on in response to a second control signal supplied from the second scanning line and brings the current path into conduction. The drive transistor causes a drive current to flow into the light-emitting element through the current path placed in a state of conduction, where the drive current depending on the signal potential stored in the pixel capacitor. The first scanner applies a first control signal to the first scanning line to turn on the sampling transistor and start sampling a signal potential. Then the first control signal applied to the first scanning line is cancelled so as to turn off the sampling transistor. During a video signal writing period from the time when the sampling transistor is turned on to the time when the sampling transistor is turned off, the second scanner applies a pulsed second control signal to the second scanning line to keep the switching transistor on for a limited correction period, and adjusts the signal potential stored in the pixel capacitor to correct a mobility of the drive transistor.

After the sampling transistor is turned off and the video signal writing period ends, the second scanner applies a second control signal to the second scanning line again to keep the sampling transistor on for a predetermined light-emitting period, and brings the current path into conduction to cause a drive current to flow into the light-emitting element.

According to an embodiment of the present invention, during the video signal writing period from the time when the sampling transistor is turned on to the time when the sampling transistor is turned off, a scanner included in a peripheral driving unit applies a pulsed control signal to a scanning line to keep the switching transistor on for a limited period of correction time. This adjusts the signal potential stored in the pixel capacitor so as to correct the mobility of the drive transistor. The mobility correction period is defined by the pulse width of the control signal applied to the gate of the switching transistor. It is possible to precisely control the mobility correction period to prevent variations in mobility correction period from pixel to pixel. Thus, luminance uniformity over the screen of the display device can be improved.

DESCRIPTION OF THE PREFERRED EMBODIMENTS

Figure 1:
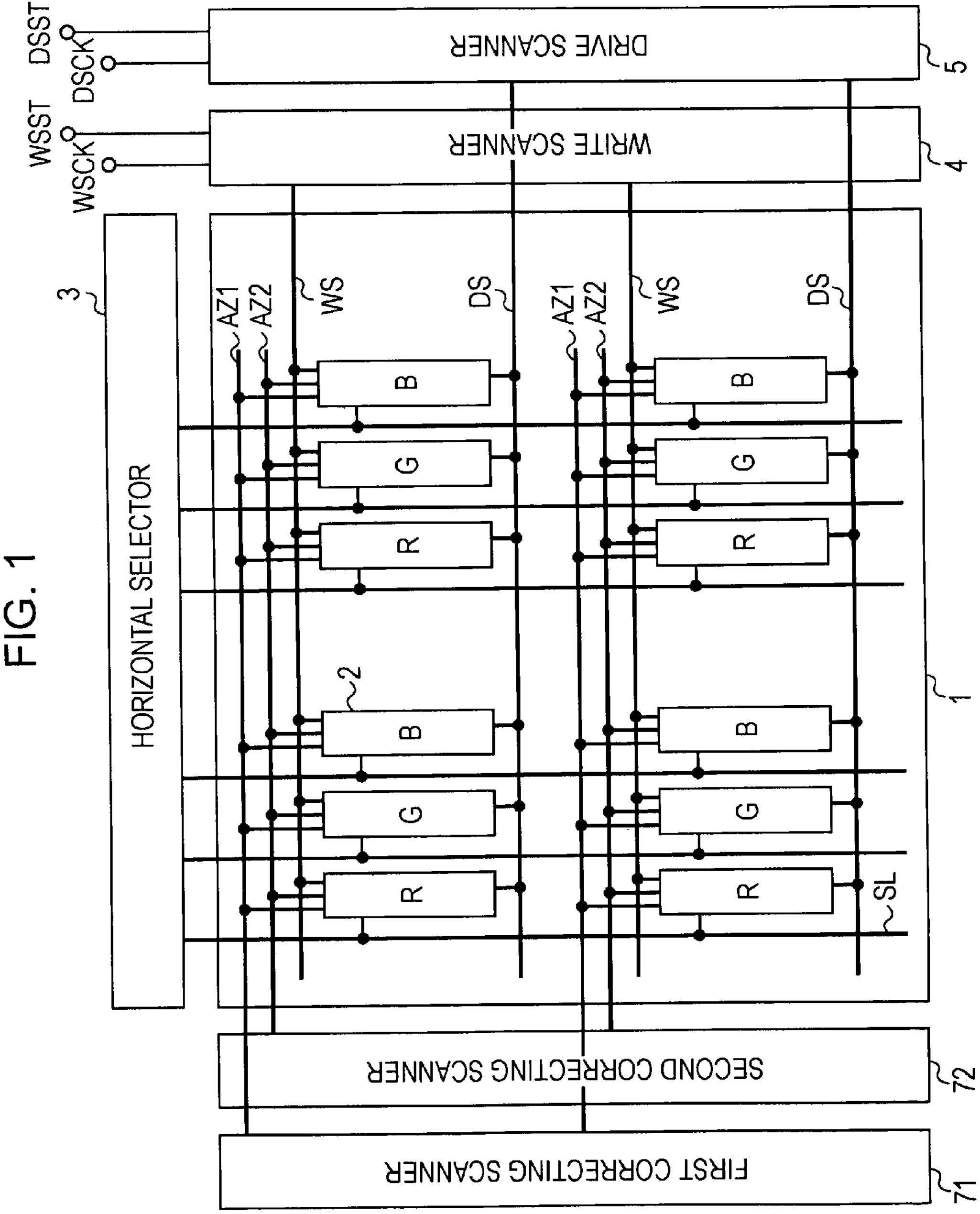
FIG. 1 is a block diagram illustrating an overall configuration of a display device according to an embodiment of the present invention.

Hereinafter, embodiments of the present invention will be described in detail with reference to the drawings. FIG. 1 is a schematic block diagram illustrating an overall configuration of a display device according to an embodiment of the present invention. As illustrated, the image display device basically includes a pixel array 1 and a drive unit including a scanner part and a signal part. The pixel array 1 includes scanning lines WS, scanning lines AZ1, scanning lines AZ2 and DS arranged in rows; signal lines SL arranged in columns; a matrix of pixel circuits 2 connected to the scanning lines WS, AZ1, AZ2, DS and to the signal lines SL; and a plurality of power supply lines for supplying a first potential Vss1, a second potential Vss2, and a third potential VDD necessary for operation of each of the pixel circuits 2. The signal part includes a horizontal selector 3, which supplies video signals to the signal lines SL. The scanner part includes a write scanner 4, a drive scanner 5, a first correcting scanner 71 and a second correcting scanner 72 that supplies control signals to the scanning lines WS, scanning lines DS, scanning lines AZ1 and AZ2, respectively, so as to sequentially scan the pixel circuits 2 on a row-by-row basis.

The write scanner 4 includes a shift register that operates in response to a externally supplied clock signal WSCK, and sequentially transfers an externally supplied start signal WSST to output control signals WS to the respective scanning lines WS. The drive scanner 5 also includes a shift register that operates in response to a clock signal DSCK externally supplied, and sequentially transfers an externally supplied start signal DSST to sequentially output control signals DS to the respective scanning lines DS.

Figure 2:
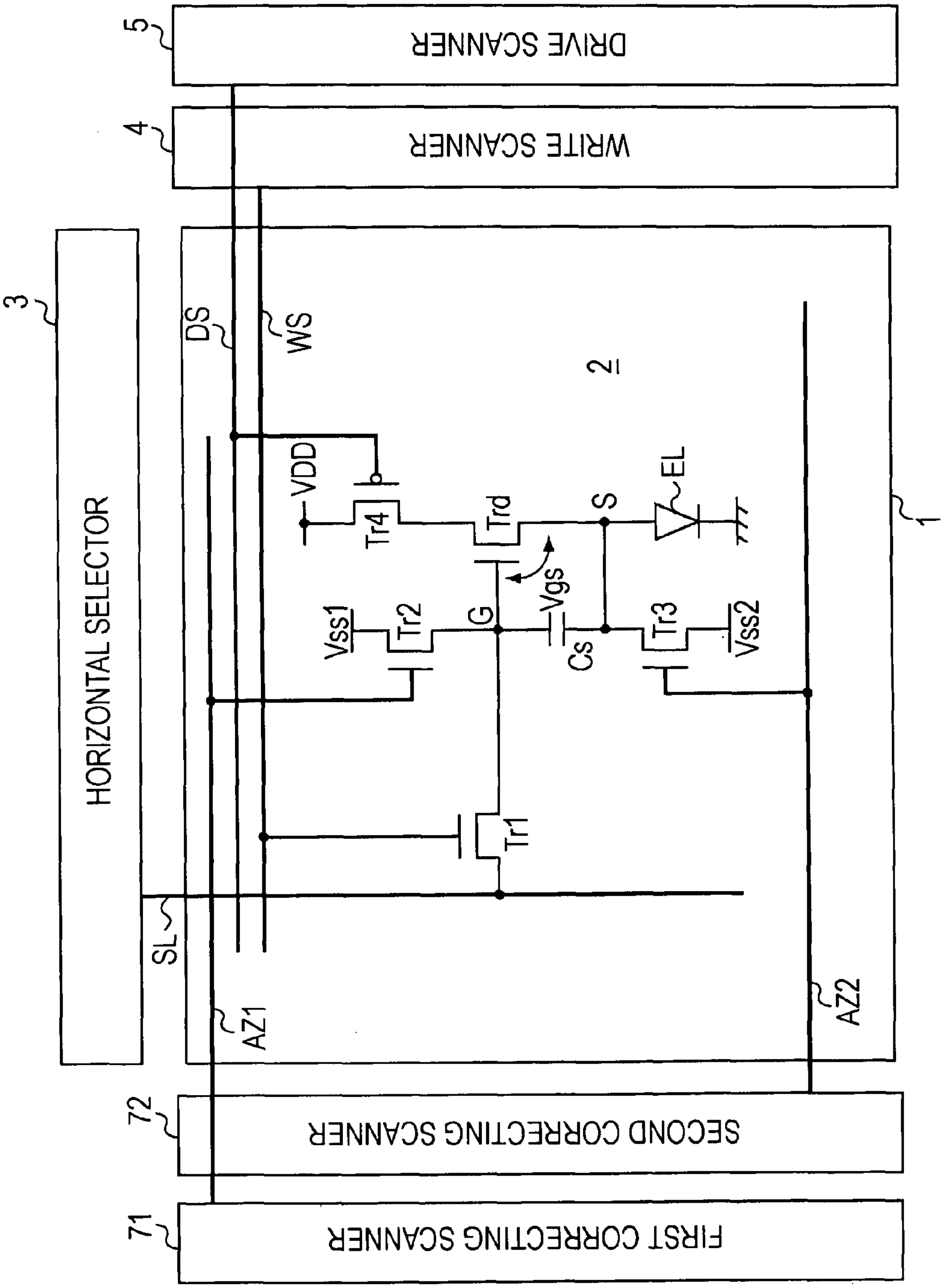
FIG. 2 is a circuit diagram illustrating a configuration of a pixel circuit in the display device of FIG. 1.

FIG. 2 is a circuit diagram illustrating a configuration of a pixel included in the image display device of FIG. 1. As illustrated, the pixel circuit 2 includes a sampling transistor Tr1, a drive transistor Trd, a first switching transistor Tr2, a second switching transistor Tr3, a third switching transistor Tr4, a pixel capacitor Cs, and a light-emitting element EL. In response to the control signal supplied from the corresponding scanning line WS during a predetermined sampling period (signal writing period), the sampling transistor Tr1 is brought into conduction, samples a video signal supplied from the corresponding signal line SL, and stores the signal potential of the sampled video signal into the pixel capacitor Cs. According to the signal potential of the sampled video signal, the pixel capacitor Cs applies an input voltage Vgs to a gate G of the drive transistor Trd. The drive transistor Trd supplies an output current Ids corresponding to the input voltage Vgs to the light-emitting element EL. In response to the output current Ids supplied from the drive transistor Trd during a predetermined light-emitting period, the light-emitting element EL emits light at an intensity corresponding to the signal potential of the video signal.

In response to a control signal supplied from the corresponding scanning line AZ1 before the sampling period is entered, the first switching transistor Tr2 is brought into conduction, and sets the gate G of the drive transistor Trd to the first potential Vss1. Similarly, in response to a control signal supplied from the corresponding scanning line AZ2 before the sampling period is entered, the second switching transistor Tr3 is brought into conduction, and sets a source S of the drive transistor Trd to the second potential Vss2. In response to a control signal supplied from the corresponding scanning line DS before the sampling period is entered, the third switching transistor Tr4 is brought into conduction, connecting the drive transistor Trd to the third potential VDD, thus causing a voltage equivalent to a threshold voltage Vth of the drive transistor Trd to be stored in the pixel capacitor Cs so as to correct the effect of the threshold voltage Vth. Additionally, in response to a control signal supplied again from the scanning line DS during the light-emitting period, the third switching transistor Tr4 is brought into conduction, connects the drive transistor Trd to the third potential VDD, and causes the output current Ids to flow through the light-emitting element EL.

As can be seen from the above description, the pixel circuit 2 includes five transistors Tr1 to Tr4 and Trd, one pixel capacitor Cs, and one light-emitting element EL. The transistors Tr1 to Tr3 and Trd are N-channel polysilicon TFTs, while only the transistor Tr4 is a P-channel polysilicon TFT. However, the present invention is not limited to this, and various combinations of both N-channel and P-channel TFTs are possible. The light-emitting element EL, for example, is a diode organic EL device having an anode and a cathode. However, the present invention is not limited to this. The light-emitting element EL may be any kind of general device that is current-driven to emit light.

According to a feature of the present invention, during a video signal writing period (sampling period) from when the sampling transistor Tr1 is turned on to the time when the sampling transistor Tr1 is turned off, the drive scanner 5 applies a pulsed control signal to the scanning line DS to keep the switching transistor Tr4 on during a limited correction period t, and adjusts the signal potential stored in the pixel capacitor Cs so as to correct a mobility μ of the drive transistor Trd.

Figure 3:
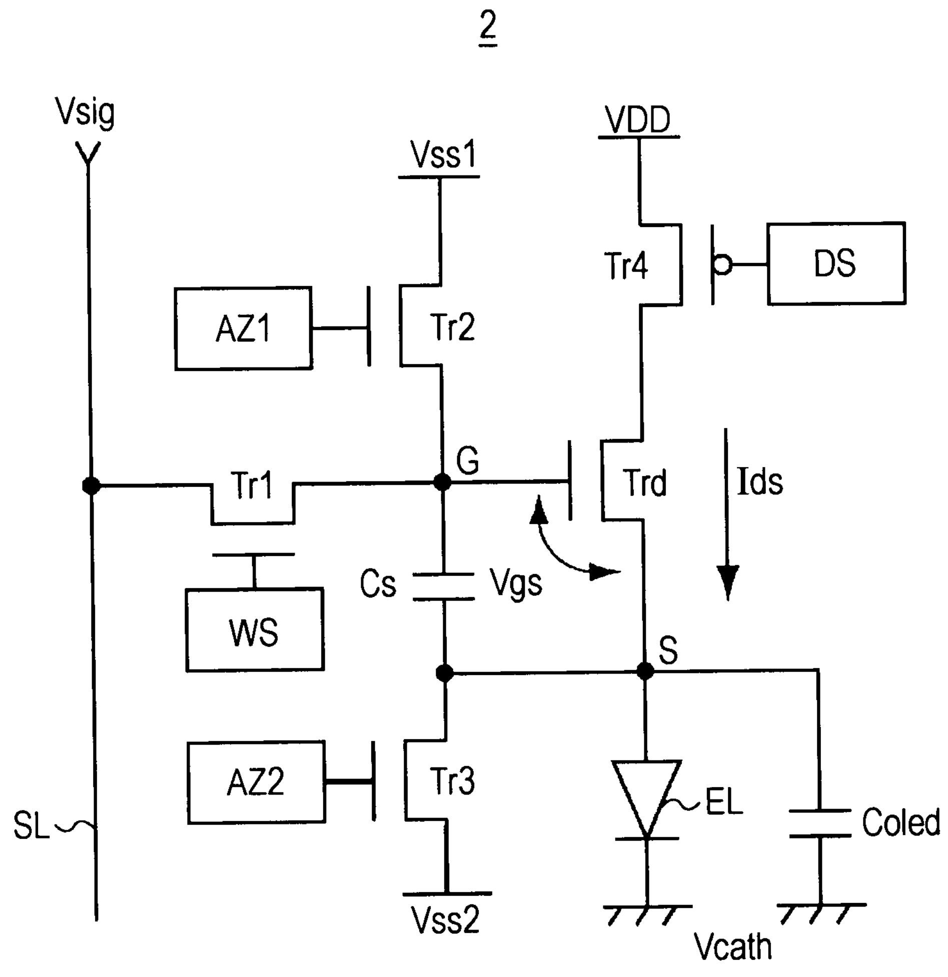
FIG. 3 is a circuit diagram illustrating an operation of the pixel circuit of FIG. 2.

FIG. 3 is a schematic view of the pixel circuit 2 taken out of the image display device illustrated in FIG. 2. For ease of understanding, a signal potential Vsig of the video signal sampled by the sampling transistor Tr1, the input voltage Vgs and output current Ids of the drive transistor Trd, and a capacitance component Coled of the light-emitting element EL are added to FIG. 3. Hereinafter, the operation of the pixel circuit 2 according to an embodiment of the present invention will be described with reference to FIG. 3.

Figure 4:
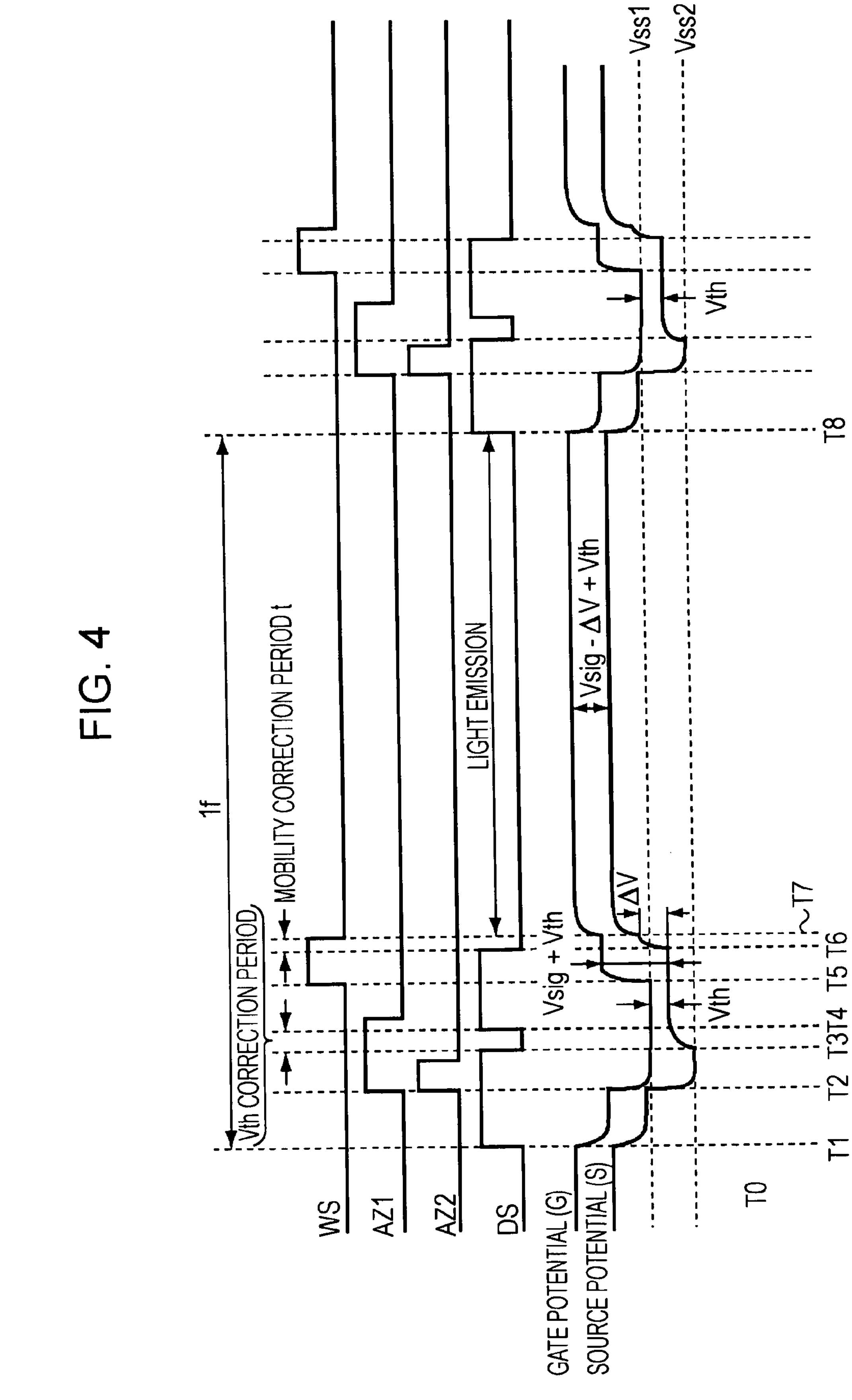
FIG. 4 is a timing chart illustrating a reference example of the operation of the pixel circuit of FIG. 3.

FIG. 4 is a timing chart for the pixel circuit 2 of FIG. 3. The timing chart of FIG. 4 shows a reference example of the operation of the pixel circuit 2 illustrated FIG. 3. To clarify the operational effect of the present invention, the reference example shown in FIG. 4 will be described first, for purposes of comparison with the present invention. FIG. 4 shows waveforms of control signals applied to the respective scanning lines WS, AZ1, AZ2, and DS along a time axis T. For simplification, the control signals are indicated by the same reference characters as those indicating the corresponding scanning lines. The transistors Tr1, Tr2, and Tr3, which are N-channel transistors, are on while the control signals WS, AZ1, and AZ2 are high, and off while the control signals WS, AZ1, and AZ2 are low. On the other hand, the transistor Tr4, which is a P-channel transistor, is off while the control signal DS is high, and on while the control signal DS is low. In addition to the waveforms of the control signals WS, AZ1, AZ2, and DS, the timing chart of FIG. 4 shows changes in the potentials of the gate G and source S of the drive transistor Trd.

In the timing chart of FIG. 4, one field (1*f*) starts at time T1 and ends at time T8. During the period of one field, the rows of the pixel array are sequentially scanned once. The timing-chart of FIG. 4 shows the waveforms of the control signals WS, AZ1, AZ2, and DS applied to one row of pixels.

At time T0 before the field (1*f*), all the control signals WS, AZ1, AZ2, and DS are at low levels. This means that the N-channel transistors Tr1, Tr2, and Tr3 are off, while only the P-channel transistor Tr4 is on. Since the drive transistor Trd is connected to the power supply VDD via the switching transistor Tr4, which is on, the drive transistor Trd supplies the output current Ids to the light-emitting element EL according to the predetermined input voltage Vgs. This causes the light-emitting element EL to emit light at time T0. The input voltage Vgs applied to the drive transistor Trd at this point can be expressed as the difference between a gate potential (G) and a source potential (S).

At time T1 when the field starts, the control signal DS goes from low to high. Since this causes the switching transistor Tr4 to be turned off and also causes the drive transistor Trd to be disconnected from the power supply VDD, light emission is stopped and a non-light-emitting period is entered. Therefore, during the period starting at time T1, all the transistors Tr1 to Tr4 are off.

Next, at time T2, the control signals AZ1 and AZ2 go high, which causes the switching transistors Tr2 and Tr3 to turn on. As a result, the gate G of the drive transistor Trd is connected to the reference potential Vss1 and the source S of the drive transistor Trd is connected to the reference potential Vss2. By satisfying the conditions Vss1−Vss2>Vth and Vss1−Vss2=Vgs>Vth, a preparation for a Vth correction to be performed at time T3 is made. In other words, the period from time T2 to time T3 corresponds to a reset period for the drive transistor Trd. Additionally, the condition VthEL>Vss2 is satisfied, where VthEL represents the threshold voltage of the light-emitting element EL. Therefore, a negative bias is applied to the light-emitting element EL, which is thus brought into a reverse-biased state. Entering the reverse-biased state is necessary for proper operation of the Vth correction and mobility correction to be performed later.

Immediately after the control signal AZ2 goes low, the control signal DS goes low at time T3. Thus, the transistor Tr3 is turned off and the transistor Tr4 is turned on. As a result, the drain current Ids flows into the pixel capacitor Cs to cause the Vth correction to start. At this point, the gate G of the drive transistor Trd is held at Vss1, and the drain current Ids keeps flowing until the drive transistor Trd is cut off. After the drive transistor Trd is cut off, the source potential (S) of the drive transistor Trd becomes equal to Vss1−Vth. After the drain current Ids is cut off, at time T4, the control signal DS goes high again and the switching transistor Tr4 is turned off. Then, the control signal AZ1 also goes low again and the switching transistor Tr2 is also turned off. As a result, the threshold voltage Vth is stored in the pixel capacitor Cs. The period from time T3 to time T4 is a period in which the threshold voltage Vth of the drive transistor Trd is detected. Here, the detection period from time T3 to time T4 is referred to as a Vth correction period.

After the Vth correction is made, at time T5, the control signal WS goes high, the sampling transistor Tr1 is turned on, and the video signal Vsig is written to the pixel capacitor Cs. The pixel capacitor Cs is sufficiently smaller than the equivalent capacitance Coled of the light-emitting element EL. Therefore, the video signal Vsig is mostly written to the pixel capacitor Cs. More precisely, the difference between the video signal Vsig and the reference potential Vss1, Vsig−Vss1, is written to the pixel capacitor Cs. Therefore, the gate-to-source voltage Vgs between the gate G and source S of the drive transistor Trd becomes equal to (Vsig−Vss1+Vth), which is the sum of the previously detected and stored threshold voltage Vth and the presently sampled difference Vsig−Vss1. If the reference potential Vss1 is set to 0 V (Vss1=0 V) for ease of explanation, the gate-to-source voltage Vgs becomes equal to Vsig+Vth as shown in the timing chart of FIG. 4. The sampling of the video signal Vsig continues until time T7 when the control signal WS goes low again. That is, the period from time T5 to time T7 corresponds to the sampling period (signal writing period).

At time T6 before time T7 when the sampling period ends, the control signal DS goes low and the switching transistor Tr4 is turned on. Since this causes the drive transistor Trd to be connected to the power supply VDD, the process in the pixel circuit proceeds from the non-light-emitting period to the light-emitting period. In the period from time T6 to time T7 in which the sampling transistor Tr1 remains on and the switching transistor Tr4 is turned on, the mobility of the drive transistor Trd is corrected. In other words, in the present reference example, the mobility correction is performed in the period from time T6 to time T7 where the end of the sampling period coincides with the beginning of the light-emitting period. At the beginning of the light-emitting period where the mobility correction is performed, the light-emitting element EL does not actually emit light because it is reverse-biased. In the mobility correction period from time T6 to time T7, the drain current Ids flows through the drive transistor Trd while the gate G of the drive transistor Trd is fixed at the level of the video signal Vsig. When the condition Vss1−Vth<VthEL is satisfied, the light-emitting element EL is reverse-biased and exhibits simple capacitance characteristics, not diode characteristics. Thus, the current Ids flowing through the drive transistor Trd is written to a capacitance C=Cs+Coled, which is the combination of the pixel capacitor Cs and the equivalent capacitance Coled of the light-emitting element EL. This causes the source potential (S) of the drive transistor Trd to increase by ΔV, as shown in the timing chart of FIG. 4. The increase ΔV is eventually subtracted from the gate-to-source voltage Vgs stored in the pixel capacitor Cs, which means that negative feedback is applied. Thus, by supplying the output current Ids of the drive transistor Trd to the input voltage Vgs of the drive transistor Trd through negative feedback, the mobility $\mu$ can be corrected. The amount of negative feedback ΔV can be optimized by adjusting the duration t of the mobility correction period from time T6 to time T7.

At time T7, the control signal WS goes low and the sampling transistor Tr1 is turned off. This causes the gate G of the drive transistor Trd to be disconnected from the signal line SL. Since the application of the video signal Vsig is cancelled, the gate potential (G) of the drive transistor Trd increases together with the source potential (S) thereof. During the period in which the gate potential (G) and the source potential (S) increase, the gate-to-source voltage Vgs stored in the pixel capacitor Cs maintains the value of (Vsig−ΔV+Vth). As the source potential (S) increases, the reverse-biased state of the light-emitting element EL is cancelled. Therefore, when the output current Ids flows into the light-emitting element EL, the light-emitting element EL actually starts emitting light. By substituting Vsig−ΔV+Vth into Vgs of Equation 1, the relationship between the drain current Ids and the gate voltage Vgs can be given by Equation 2 as follows:

$$Ids=k\mu(Vgs-Vth)^2=k\mu(Vsig-\Delta V)^2 \quad \text{Equation 2}$$

where k=(½)(W/L)Cox. Equation 2 indicates that the term Vth is canceled, and the output current Ids supplied to the light-emitting element EL is not dependent on the threshold voltage Vth of the drive transistor Trd. Basically, the drain current Ids is determined by the signal voltage Vsig of the video signal. In other words, the light-emitting element EL emits light at an intensity depending on the video signal Vsig, which is corrected with the amount of negative feedback ΔV. The amount of correction ΔV acts to cancel the effect of the mobility μ located in the coefficient part of Equation 2. Therefore, the drain current Ids is dependent only on the video signal Vsig.

Last, at time T8, the control signal DS goes high and the switching transistor Tr4 is turned off. Upon completion of light emission, the present field ends. In the subsequent field, the Vth correction process, the mobility correction process, and the light-emitting process are repeated.

Figure 5:
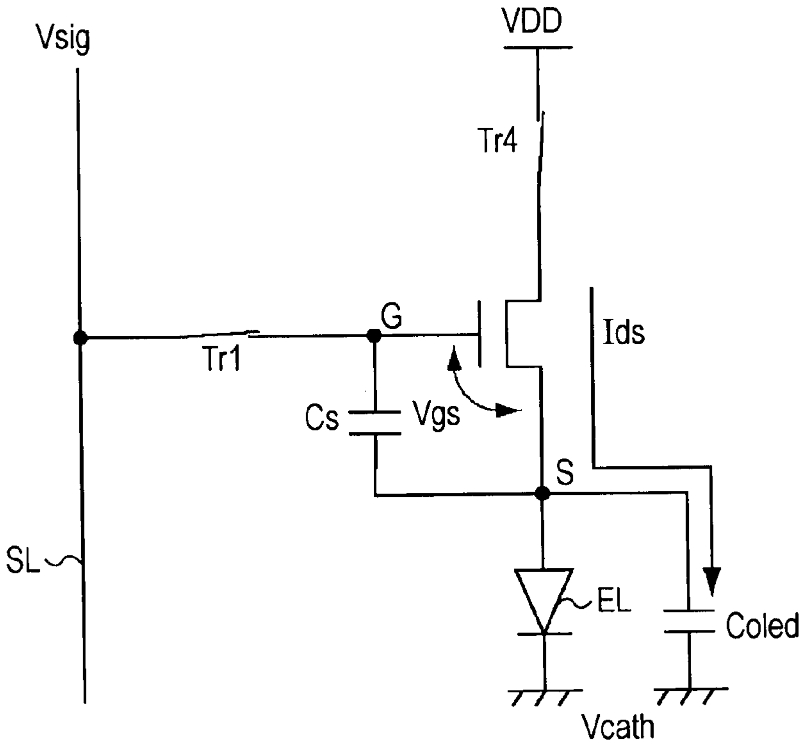
FIG. 5 is a circuit diagram illustrating the reference example of FIG. 4.

FIG. 5 is a circuit diagram illustrating a state of the pixel circuit 2 in the mobility correction period from time T6 to time T7. As illustrated, the sampling transistor Tr1 and the third switching transistor Tr4 are on in the mobility correction period from time T6 to time T7, while the remaining switching transistors Tr2 and Tr3 are off. In this state, the source potential (S) of the drive transistor Trd can be expressed as Vss1−Vth. The source potential (S) also serves as the anode potential of the light-emitting element EL. As described above, when the condition Vss1−Vth<VthEL is satisfied, the light-emitting element EL is reverse-biased and exhibits simple capacitance characteristics, not diode characteristics. Thus, the current Ids flowing through the drive transistor Trd flows into the capacitance C=Cs+Coled, which is the combination of the pixel capacitor Cs and the equivalent capacitance Coled of the light-emitting element EL. In other words, part of the drain current Ids is supplied to the pixel capacitor Cs through negative feedback, thus performing mobility correction.

Figure 6:
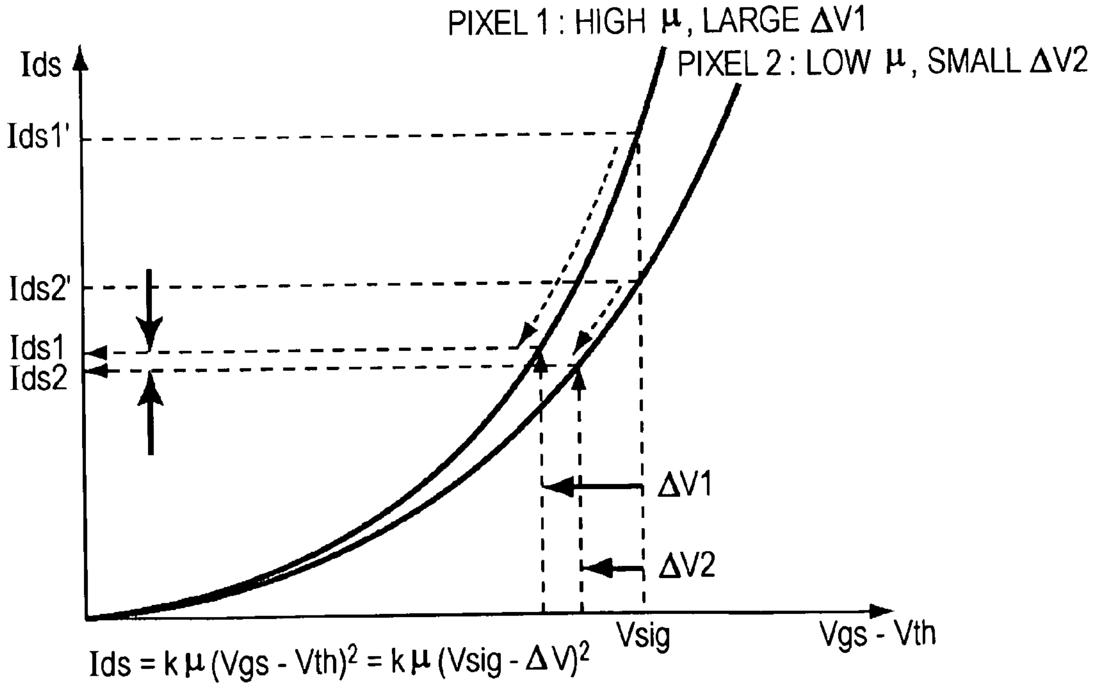
FIG. 6 is a graph illustrating the reference example of FIG. 4.

FIG. 6 shows Equation 2 in graphical form. The vertical axis of the graph represents Ids and the horizontal axis of the graph represents Vsig. Equation 2 is also presented under the graph. In the graph of FIG. 6, characteristic curves for Pixel 1 and Pixel 2 are plotted for comparison purposes. The mobility μ of a drive transistor included in Pixel 1 is relatively high, while the mobility μ of a drive transistor included in Pixel 2 is relatively low. Thus, when the drive transistors are polysilicon TFTs or the like, the mobility μ inevitably varies between the pixels. For example, if the signal potentials of the video signals Vsig having the same level are written to Pixels 1 and 2 and no mobility correction is made, there will be a considerable difference between an output current i' flowing through Pixel 1 having a higher mobility μ and an output current Ids2' flowing through Pixel 2 which has a lower mobility μ. Since variations in mobility μ cause a considerable difference between the output currents Ids, streaky unevenness may occur and luminance uniformity over the screen will be degraded.

Therefore, in the present reference example, variations in mobility are cancelled by supplying the output current to the input voltage through negative feedback. As can be seen from Equation 1, the higher the mobility, the larger the drain current Ids. This means that the higher the mobility, the larger the amount of negative feedback ΔV. As shown in the graph of FIG. 6, the amount of negative feedback ΔV1 for Pixel 1 having a higher mobility μ is larger than the amount of negative feedback ΔV2 for Pixel 2 having a lower mobility μ. That is, a lager amount of negative feedback is applied to a pixel having a higher mobility μ, and variations in mobility μ can be suppressed. As shown in FIG. 6, if the mobility is corrected by ΔV1 for Pixel 1 having a higher mobility μ, the output current is significantly reduced from Ids1' to Ids1. On the other hand, since the amount of correction ΔV2 for Pixel 2 having a lower mobility μ is smaller, the output current is reduced from Ids2' to Ids2, which is not significant. Consequently, Ids1 and Ids2 become substantially equal, and variations in mobility are cancelled. Since the cancellation of mobility variations is performed over the entire range of Vsig from a black level to a white level, the luminance uniformity over the screen is made extremely high. In summary, if there are Pixels 1 and 2 with different mobilities, the amount of correction ΔV1 for Pixel 1 having a higher mobility μ is larger than the amount of correction ΔV2 for Pixel 2 having a lower mobility μ. In other words, the higher the mobility, the larger the amount of correction ΔV and thus a greater reduction in the output current Ids. As a result, the values of currents flowing through pixels having different mobilities are made uniform, and variations in mobility can be corrected.

For reference purposes, a numerical analysis of the above mobility correction will be described. The analysis is performed while the transistors Tr1 and Tr4 are on, as illustrated in FIG. 5. Here, the source potential of the drive transistor Trd is used as a variable V. The drain current Ids flowing through the drive transistor Trd is expressed by Equation 3 as follows:

$$I_{ds}=k\mu(V_{gs}-V_{th})^2=k\mu(V_{sig}-V-V_{th})^2 \quad \text{Equation 3}$$

where V represents the source potential (S) of the drive transistor Trd.

On the basis of the relationship between the drain current Ids and the capacitance C (=Cs+Coled), Ids=dQ/dt=CdV/dt is satisfied, as indicated by Equation 4 below:

Equation 4

$$\text{From } I_{ds}=\frac{dQ}{dt}=C\frac{dV}{dt},\ \int\frac{1}{C}dt=\int\frac{1}{I_{ds}}dV \Leftrightarrow \int_0^t\frac{1}{C}dt=$$

$$\int_{-Vth}^{V}\frac{1}{k\mu(V_{sig}-V_{th}-V)^2}dV \Leftrightarrow \frac{k\mu}{C}t=$$

$$\left[\frac{1}{V_{sig}-V_{th}-V}\right]_{-Vth}^{V}=\frac{1}{V_{sig}-V_{th}-V}-\frac{1}{V_{sig}} \Leftrightarrow$$

$$V_{sig}-V_{th}-V=\frac{1}{\frac{1}{V_{sig}}+\frac{k\mu}{C}t}=\frac{V_{sig}}{1+V_{sig}\frac{k\mu}{C}t}$$

Then, Equation 3 is substituted into Equation 4 and both sides of the resulting equation are integrated, where −Vth is the initial value of the source voltage V and t is the mobility variation correction period (from time T6 to time T7) for correcting variations in mobility. Solving this differential equation gives Equation 5, which expresses the pixel current with respect to the mobility correction period t as follows:

$$I_{ds} = k\mu\left(\frac{V_{sig}}{1 + V_{sig}\frac{k\mu}{C}t}\right)^2 \qquad \text{Equation 5}$$

Figure 7:
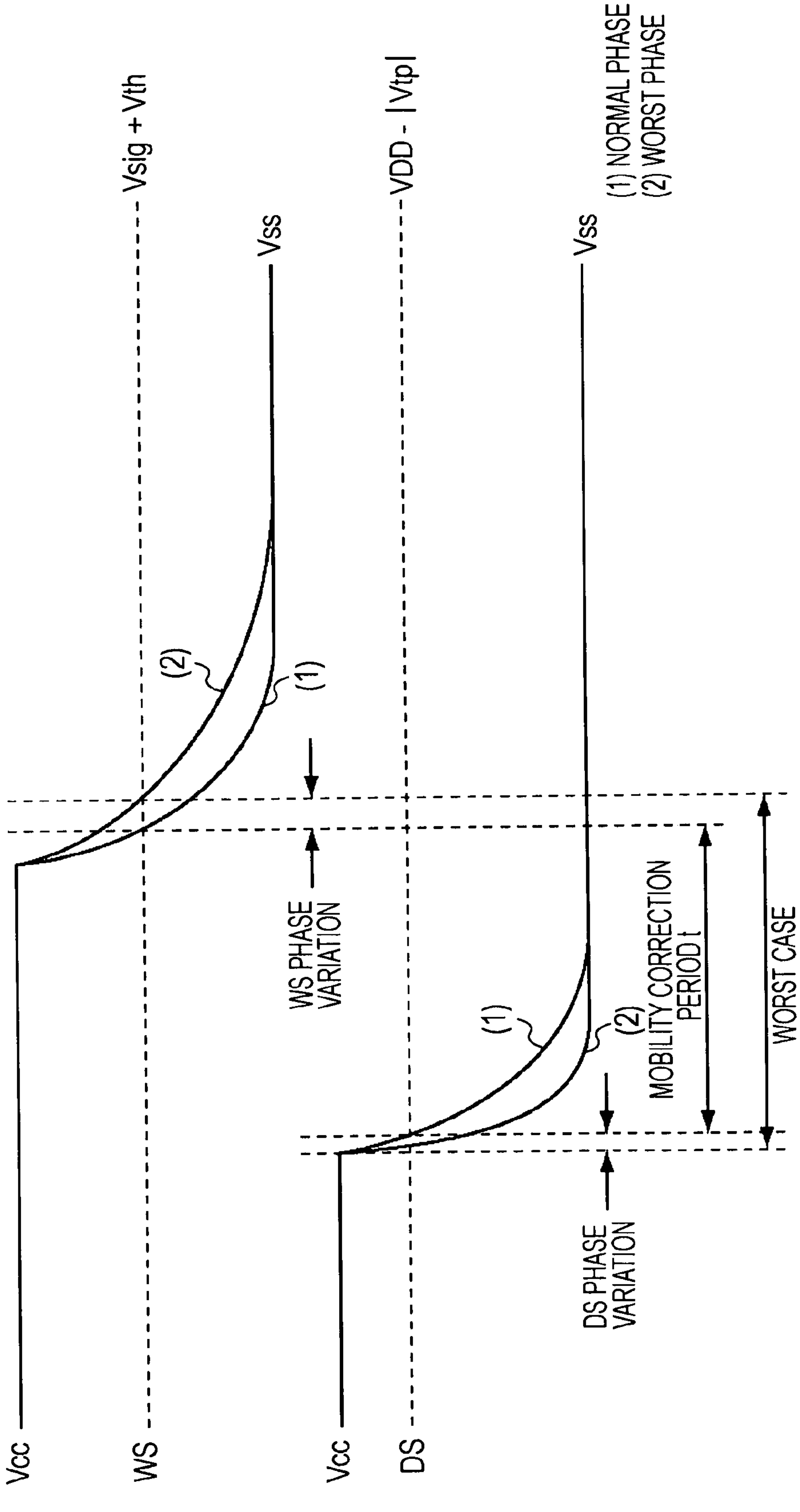
FIG. 7 is a waveform diagram illustrating the reference example of FIG. 4.

As described above, the output current that flows through the light-emitting element in each pixel is expressed by Equation 5 above. In Equation 5, the mobility correction period μ is set to several microseconds (μm). As described above, the mobility correction period t is determined by the interval between turn-on time (falling time) of the switching transistor Tr4 and turn-off time (falling time) of the sampling transistor Tr1. FIG. 7 shows, along the time axis, a falling waveform of the control signal DS applied to the gate of the switching transistor Tr4 and a falling waveform of the control signal WS applied to the gate of the sampling transistor Tr1. The scanning lines through which the control signals DS and WS are transmitted are pulse wires made of a material having a relatively high resistance, such as metallic molybdenum. Since the overlap parasitic capacitance between wires on adjacent layers is large, the time constant of the pulse wires is large, which makes the falling waveforms of the control signals DS and WS less steep. That is, the control signals DS and WS do not fall instantaneously, but fall rather gradually from the power supply potential Vcc to the ground potential Vss, due to the effect of the time constant determined by wiring capacitance and wiring resistance. The falling waveforms are applied to the gates of the switching transistor Tr4 and sampling transistor Tr1.

On the other hand, the signal potential Vsig is supplied to the source of the sampling transistor Tr1. Therefore, the sampling transistor Tr1 is turned off when the gate potential falls below Vsig+Vtn, where Vtn represents the threshold voltage of the N-channel sampling transistor Tr1. Similarly, the source of the switching transistor Tr4 is connected to the power supply potential VDD of the pixel. Therefore, the switching transistor Tr4 is turned on when the gate potential of the switching transistor Tr4 drops to VDD−|Vtp|, where Vtp represents the threshold voltage of the P-channel switching transistor Tr4.

The falling waveform of the control signal DS varies. In the lower part of FIG. 7, (1) indicates a normal phase, while (2) indicates the worst case in which the slope of the falling waveform becomes steeper. Such variations in the falling waveform of the control signal DS cause variations in the turn-on time of the switching transistor Tr4. The falling waveform of the control signal WS also varies. In the upper part of FIG. 7, (1) indicates a normal phase, while (2) indicates the worst case in which the slope of the falling waveform becomes less steep. Such variations in the falling waveform of the control signal WS cause variations in the turn-off time of the sampling transistor Tr1. If the turn-on time of the switching transistor Tr4 and the turn-off time of the sampling transistor Tr1 are shifted in the opposite directions as in the worst cases described above, the mobility correction period t defined by the interval between these time points is considerably shifted from that in the case of the normal phases. As a result, this appears as variations in the intensity of emitted light.

Figure 8:
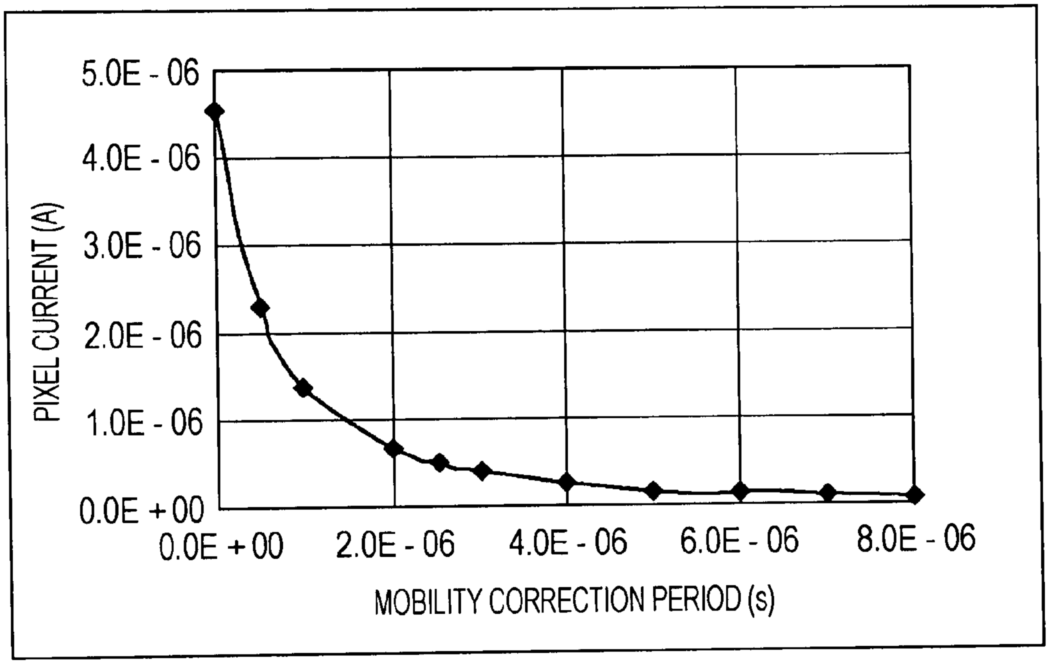
FIG. 8 is a graph illustrating the reference example of FIG. 4.

FIG. 8 is a graph showing the relationship between the mobility correction period and the drive current (pixel current) flowing through a pixel. In the graph of FIG. 8, the horizontal axis represents the mobility correction period and the vertical axis represents the pixel current. As can be seen from the graph, if the mobility correction period varies, the pixel current also varies from pixel to pixel, thus degrading the luminance uniformity over the screen. As described above, variations in mobility correction period are primarily caused by variations in the transient response of the control signals applied to the gates of the sampling transistor Tr1 and switching transistor Tr4.

Figure 9:
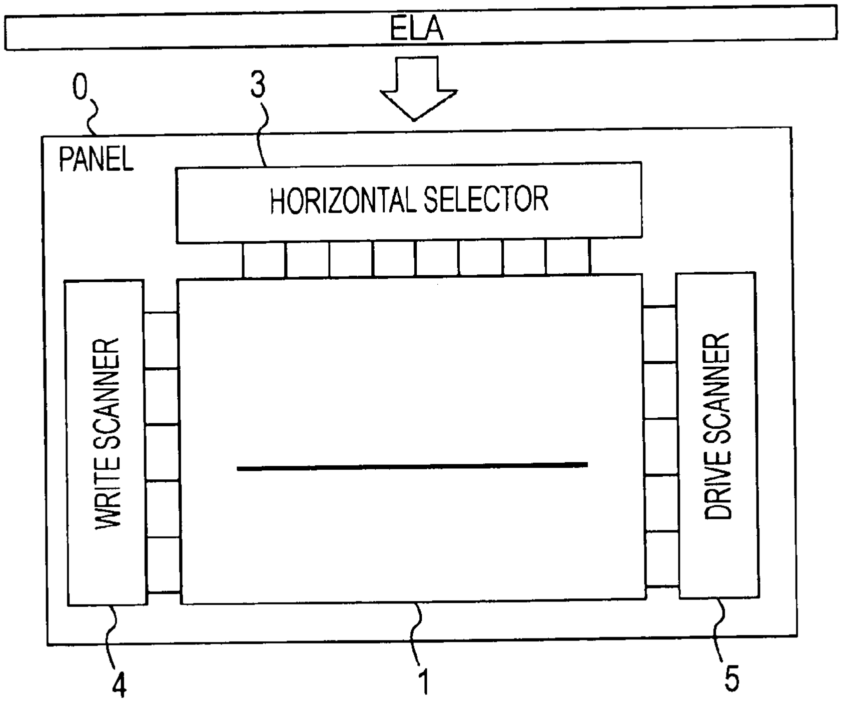
FIG. 9 is a diagram illustrating the reference example of FIG. 4.

FIG. 9 is a diagram for explaining the cause of variations in the transient response of the control signals described above. As illustrated in FIG. 9, the display device is composed of a single insulating substrate, which is a flat panel 0 on which the write scanner 4, the drive scanner 5, and the horizontal selector 3 are formed around the pixel array 1 in an integrated manner. Like the pixel array 1 in the center, these peripheral drive units are formed of TFTs in an integrated manner. Generally, a TFT includes a polysilicon layer as a device area. The polysilicon layer is produced, for example, by forming an amorphous silicon thin film on an insulating substrate, and applying laser light to the amorphous silicon thin film to crystallize and transform it into the polysilicon layer. In the process of application of laser light, for example, a linear laser beam (excimer laser annealing or ELA) is sequentially applied to the panel 0 in the downward direction thereof in an overlaying manner, thus transforming the amorphous silicon film into the polysilicon layer. If there are local variations in the laser output during the process of laser light application, the crystallinity of the polysilicon layer varies depending on the position in the up-and-down direction of the panel 0. This results in variations in characteristics among TFTs. Typically, such variations in characteristics appear in the horizontal direction of the panel 0 along the path of laser light. In the example of FIG. 9, a correction period in some lines of the panel 0 is different from that in the other lines, because the characteristics of the corresponding transistors, which are some of transistors serving as the output stages of the scanners, are different from those of the others. As shown in FIG. 8, since variations in correction period lead to variations in pixel current, unevenness in luminance occurs along the lines. If the correction period is shorter than the average, the amount of negative feedback for a signal potential is small, which causes a streak brighter than its surroundings to appear. On the other hand, if the correction period is longer than the average, the amount of negative feedback for a signal potential is large, which lowers the signal potential and causes a streak darker than its surroundings to appear.

Referring to FIG. 9, the output stages of the write scanner 4 are in a one-to-one correspondence with, and are aligned with the output stages of the drive scanner 5. If the corresponding output stages between the write scanner 4 and the drive scanner 5 are aligned with each other on the same line, there will be no significant phase difference between the control signals output from both scanners. However, if the corresponding output stages of the write scanner 4 and drive scanner 5 go out of alignment even to a slight degree, the application conditions of the laser beam (ELA) are shifted accordingly. This causes a phase difference and variations in transient response between the outputs from the write scanner 4 and drive scanner 5. As a result, the mobility correction period determined by the time interval between the control signal from the write scanner 4 and that from the drive scanner 5 also varies.

Figure 10:
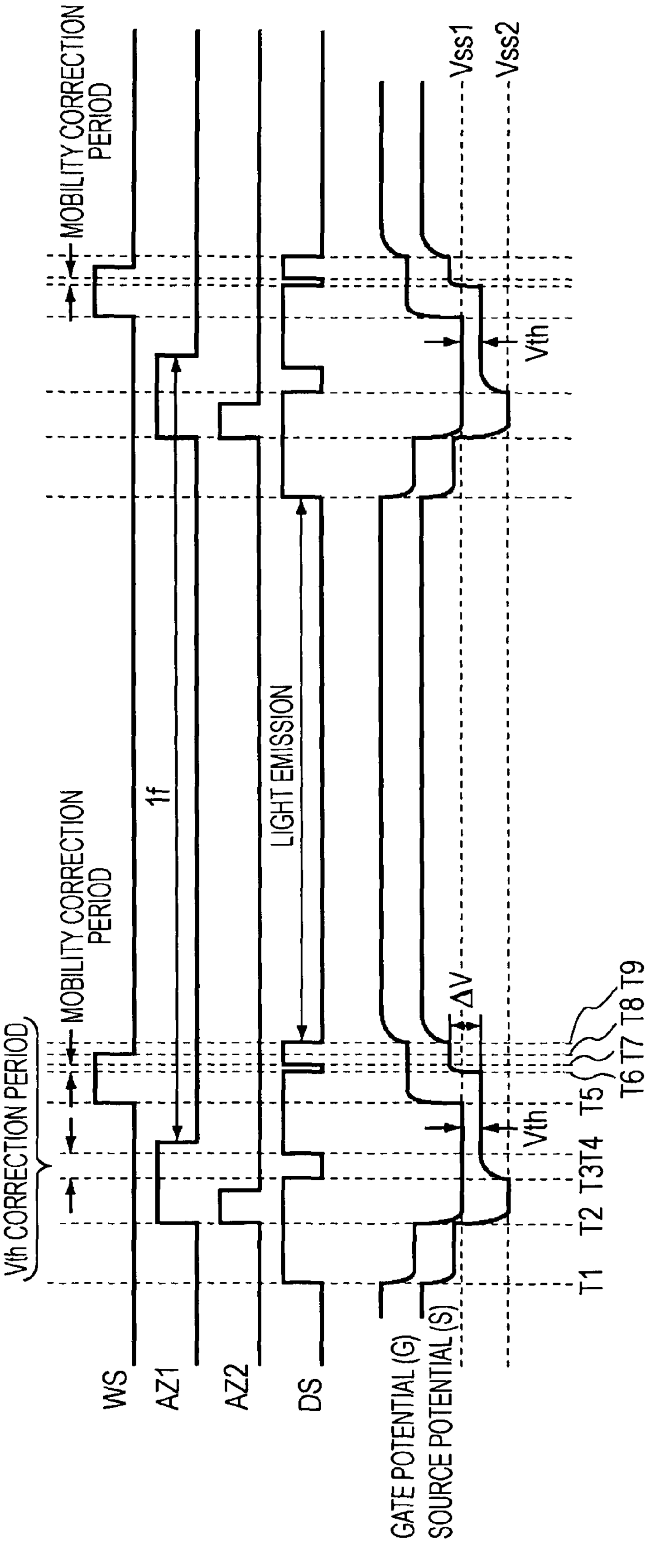
FIG. 10 is a timing chart illustrating an operation of the display device according to an embodiment of the present invention.

FIG. 10 is a timing chart for explaining the operation of the display device illustrated in FIG. 1 to FIG. 3, according to an embodiment of the present invention. For ease of understanding, FIG. 10 uses reference characters identical to those used in FIG. 4. In the timing chart of FIG. 10, the mobility correction period is determined by only the control signal DS output from the drive scanner 5 unlike in the case of the reference example illustrated in FIG. 4. This makes it possible to suppress variations in mobility correction period, which is described above in the reference example. Hereinafter, the operation of the display device according to an embodiment of the present invention will be described in detail with reference to FIG. 10.

At time T1 when the field starts, the control signal DS goes from low to high. Since this causes the switching transistor Tr4 to be turned off and also causes the drive transistor Trd to be disconnected from the power supply VDD, light emission is stopped and a non-light-emitting period is entered. Therefore, during the period starting at time T1, all the transistors Tr1 to Tr4 are off.

Next, at time T2, the control signals AZ1 and AZ2 go high, which causes the switching transistors Tr2 and Tr3 to be turned on. As a result, the gate G of the drive transistor Trd is connected to the reference potential Vss1 and the source S of the drive transistor Trd is connected to the reference potential Vss2. By satisfying the conditions, Vss1−Vss2>Vth and Vss1−Vss2=Vgs>Vth, a preparation for a Vth correction to be performed at time T3 is made. In other words, the period from time T2 to time T3 corresponds to a reset period for the drive transistor Trd. Additionally, the condition VthEL>Vss2 is satisfied, where VthEL represents the threshold voltage of the light-emitting element EL. Therefore, a negative bias is applied to the light-emitting element EL, which is then brought into a reverse-biased state. Entering the reverse-biased state is necessary for proper operation of the Vth correction and mobility correction to be performed later.

Immediately after the control signal AZ2 goes low, the control signal DS goes low at time T3. Thus, the transistor Tr3 is turned off and the transistor Tr4 is turned on. As a result, the drain current Ids flows into the pixel capacitor Cs to cause the Vth correction to start. At this point, the gate G of the drive transistor Trd is held at Vss1, and the drain current Ids keeps flowing until the drive transistor Trd is cut off. After the drive transistor Trd is cut off, the source potential (S) of the drive transistor Trd is made equal to Vss1−Vth. After the drain current Ids is cut off, at time T4, the control signal DS goes high again and the switching transistor Tr4 is turned off. Then, the control signal AZ1 goes low again and the switching transistor Tr2 is also turned off. As a result, the threshold voltage Vth is stored in the pixel capacitor Cs. The period from time T3 to time T4 is a period in which the threshold voltage Vth of the drive transistor Trd is detected. Here, the detection period from time T3 to time T4 is referred to as the Vth correction period.

After the Vth correction is made, at time T5, the control signal WS goes high, the sampling transistor Tr1 is turned on, and the video signal Vsig is written to the pixel capacitor Cs. The pixel capacitor Cs is sufficiently smaller than the equivalent capacitance Coled of the light-emitting element EL. Therefore, the video signal Vsig is mostly written to the pixel capacitor Cs. More precisely, the difference between the video signal Vsig and the reference potential Vss1, Vsig−Vss1, is written to the pixel capacitor Cs. Therefore, the gate-to-source voltage Vgs between the gate G and source S of the drive transistor Trd becomes equal to (Vsig−Vss1+Vth), which is the sum of the previously detected and stored threshold voltage Vth and the presently sampled difference Vsig−Vss1. If the reference potential Vss1 is set to 0 V (Vss1=0 V) for ease of explanation, the gate-to-source voltage Vgs becomes equal to Vsig+Vth as shown in the timing chart of FIG. 10. The sampling of the video signal Vsig continues until time T8 when the control signal WS goes low again. That is, the period from time T5 to time T8 corresponds to the sampling period.

Before time T8 at which the sampling period (video signal writing period) ends, the pulsed control signal DS is applied to the scanning line DS. The pulsed control signal DS, which falls at time T6 and rises at time T7, is a negative pulse having a relatively short pulse width. In the period from time T6 to time T7, the switching transistor Tr4 is turned on and the mobility correction period is defined. The mobility correction period from time T6 to time T7 is determined only by the pulse width of the control signal DS, and does not significantly vary from pixel to pixel. The mobility correction period from time T6 to time T7 falls within the video signal writing period from time T5 to time T8.

As described above, in the mobility correction period from time T6 to time T7, the switching transistor Tr4 is turned on, which causes the drive transistor Trd to be connected to the power supply VDD. At this point, since the sampling transistor Tr1 is on, the drain current Ids flows through the drive transistor Trd while the gate G of the drive transistor Trd is fixed at the level of the video signal Vsig. When the condition Vss1−Vth<VthEL is satisfied, the light-emitting element EL is reverse-biased and exhibits simple capacitance characteristics, not diode characteristics. Thus, the drain current Ids flowing through the drive transistor Trd is written to the capacitance C=Cs+Coled, which is the combination of the pixel capacitor Cs and the equivalent capacitance Coled of the light-emitting element EL. This causes the source potential (S) of the drive transistor Trd to increase by ΔV, as shown in the timing chart of FIG. 10. The increase ΔV is eventually subtracted from the gate-to-source voltage Vgs stored in the pixel capacitor Cs, which means that negative feedback is applied. Thus, by supplying the output current Ids of the drive transistor Trd to the input voltage Vgs of the drive transistor Trd through negative feedback, the mobility μ can be corrected. By precisely controlling the duration of the mobility correction period from time T6 to time T7, variations in the amount of negative feedback ΔV among pixels can be suppressed.

At time T8, the control signal WS goes low and the sampling transistor Tr1 is turned off. This causes the gate G of the drive transistor Trd to be disconnected from the signal line SL. Then, at time T9, the control signal DS goes low again and the drive transistor Trd is connected to the power supply VDD. This causes a current to flow through the light-emitting element EL. At the same time, the source potential (S) of the drive transistor Trd increases, while the gate potential (G) of the drive transistor Trd also increases in synchronization therewith. During the period in which the gate potential (G) and the source potential (S) increase, the gate-to-source voltage Vgs stored in the pixel capacitor Cs maintains the value of (Vsig−ΔV+Vth). As the source potential (S) increases, the reverse-biased state of the light-emitting element EL is cancelled. Therefore, when the output current Ids flows into the light-emitting element EL, the light-emitting element EL actually starts emitting light.

Figure 11:
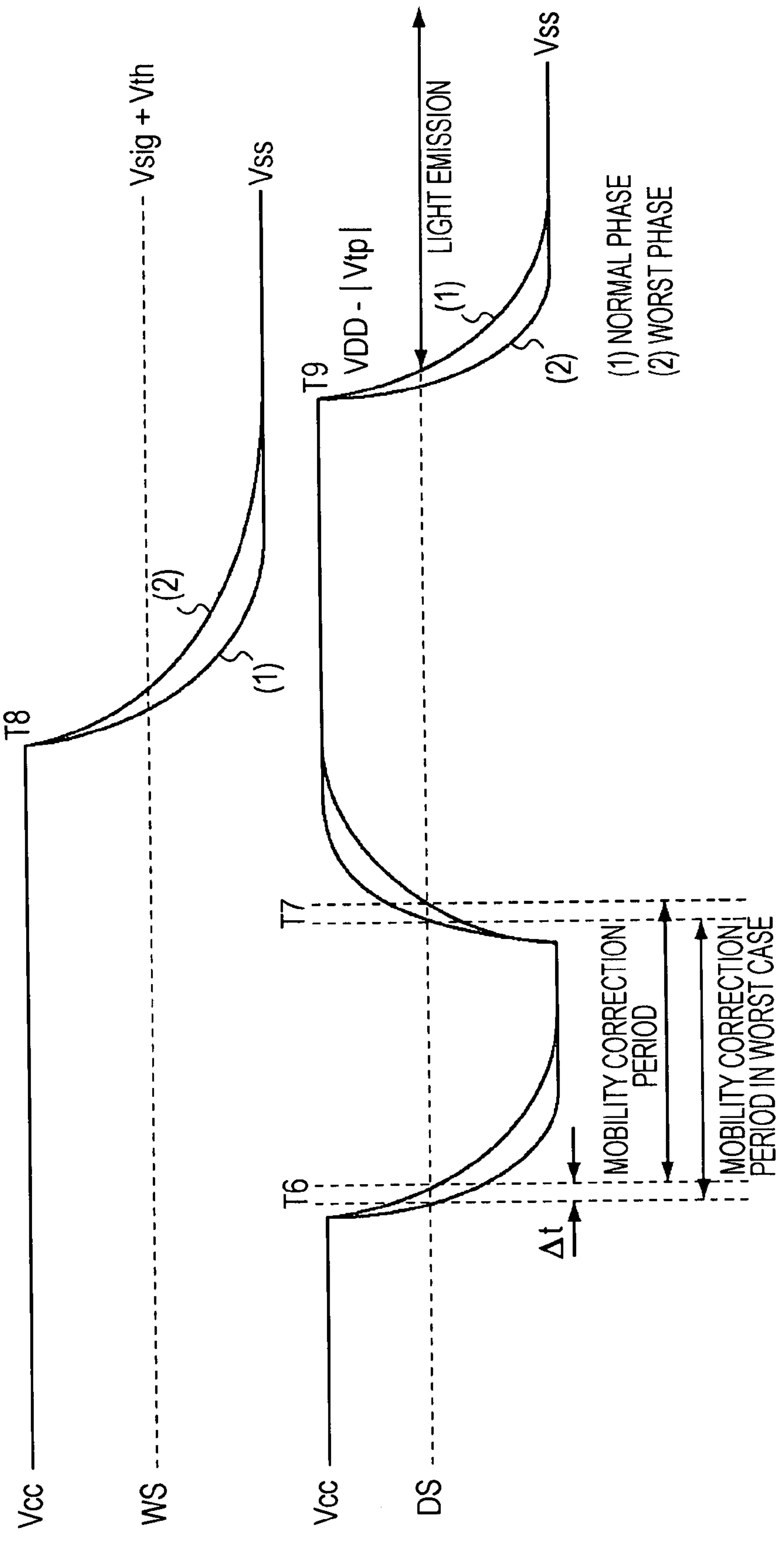
FIG. 11 is a waveform diagram illustrating the operation of FIG. 10.

FIG. 11 schematically shows changes in the waveforms of the control signals WS and DS observed during the period from time T6 to time T9 in the timing chart of FIG. 10. For ease of understanding, FIG. 11 uses reference characters identical to those used in the waveform diagram of FIG. 7.

The control signal WS is applied to the gate of the sampling transistor Tr1. The control signal WS falls from Vcc to Vss at time T8. The falling waveform of the control signal WS varies among lines. In the upper part of FIG. 11, (1) indicates a normal state, while (2) indicates the worst state in which the slope of the falling waveform becomes less steep. As described above, the signal potential Vsig is supplied to the source of the sampling transistor Tr1. Therefore, the sampling transistor Tr1 is turned off when the gate potential falls below Vsig+Vtn. If the slope of the falling waveform of the control signal WS is less steep, falling time T8 will vary between the normal phase (1) and the worst phase (2).

On the other hand, the control signal DS is applied to the gate of the switching transistor Tr4. During the period from time T6 to time T7, the control signal DS is a negative pulse. At time T9, the control signal DS becomes a negative pulse again and is applied to the scanning line DS. In the lower part of FIG. 11, (1) indicates a normal phase of the waveform of the control signal DS, while (2) indicates the worst phase in which the slope of the waveform of the control signal DS becomes steeper, which is opposite to the case of the control signal WS.

The source of the switching transistor Tr4 is connected to the power supply potential VDD of the pixel. Therefore, the switching transistor Tr4 is turned on when the gate potential of the switching transistor Tr4 drops to VDD−|Vtp|. Here, the time when the negative pulse of the control signal DS crosses the level of VDD−|Vtp| varies between the normal phase (1) and the worst phase (2). As shown in FIG. 11, falling time T6 and rising time T7 each vary by about Δt between the normal phase (1) and the worst phase (2). However, the direction in which the worst phase (2) is shifted from the normal phase (1) at time T6 is the same as that at time T7. Therefore, although there are variations in both T6 and T7 between the normal phase (1) and the worst phase (2), there is almost no variation in mobility correction period t between the normal phase (1) and the worst phase (2). Thus, in the present invention, the mobility correction period is determined by only the negative pulse of the control signal DS.

As shown in FIG. 11, during the period in which the control signal WS is at a high level and the sampling transistor Tr1 is on, the control signal DS is lowered and the switching transistor Tr4 is turned on. Then, during the period in which the sampling transistor Tr1 is kept on, the control signal DS is raised and the switching transistor Tr4 is turned off. After the control signal WS falls and the sampling transistor Tr1 is turned off, the control signal DS is lowered again and the switching transistor Tr4 is turned on, which causes the light-emitting element EL to emit light. That is, in the present invention, the mobility correction is controlled only by the negative pulse of the control signal DS. Therefore, no problem arises even if the output characteristics vary between the corresponding output stages of the drive scanner 5 and the write scanner 4. The mobility correction period is determined only by the pulse of the control signal DS. Since variations in the rising point and falling point of the pulse occur in the same direction, it is possible to suppress variations in mobility correction period. In the present invention, the mobility correction period is determined only by the pulse of the control signal DS. Even if the transmission period during which the pulse of the control signal DS is transmitted varies, there is no operational problem as far as the transmission period falls within the period during which the sampling transistor Tr1 is on. Even if the transient response or phase of the control signal DS varies, there is substantially no change in time difference between the time when the switching transistor Tr4 is turned on and the time when the switching transistor Tr4 is turned off, thus presenting no significant variation in mobility correction period. At the same time, variations in the phase of the control signal WS do not affect the mobility correction process. Therefore, even if characteristics vary among transistors included in the write scanner or drive scanner, it is possible to precisely control the mobility correction period. Thus, image quality problems, such as streaky unevenness and the like, can be suppressed and images with a high degree of luminance uniformity can be achieved.

Figure 12:
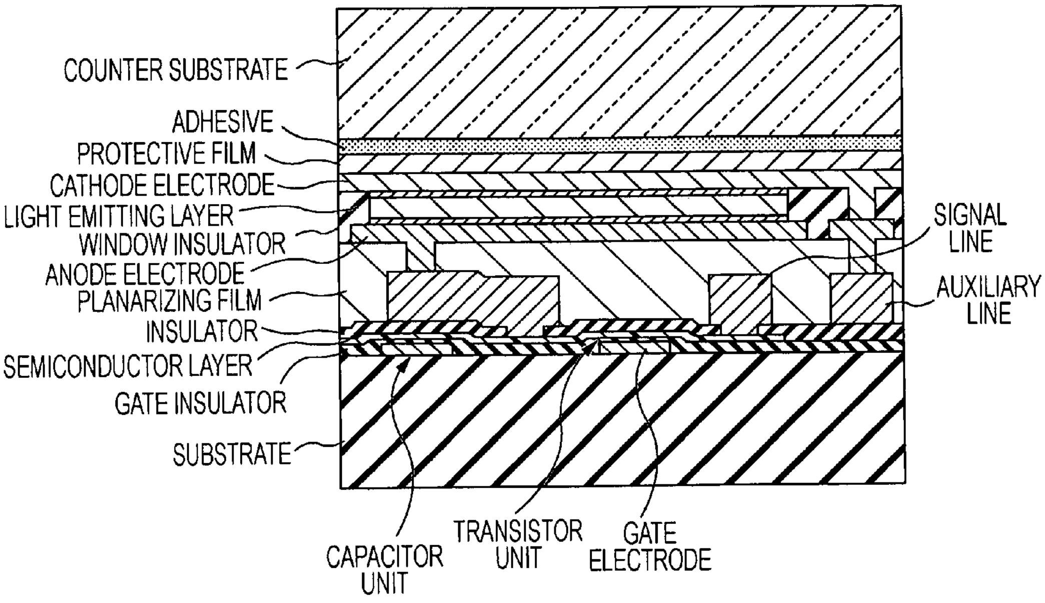
FIG. 12 is a cross-sectional view illustrating a device structure of a display device according to an embodiment of the present invention.

FIG. 12 is a cross-sectional view illustrating a thin-film structure of a display device according to an embodiment of the present invention. FIG. 12 schematically illustrates a cross section of a pixel formed on an insulating substrate. As illustrated, the pixel includes a transistor unit including a plurality of TFTs (only one TFT is shown in FIG. 12), a capacitor unit such as a hold capacitor, and a light-emitting unit such as an organic EL element. The transistor unit and the capacitor unit are formed by a TFT process on the substrate, the light-emitting unit is formed thereon, and a transparent counter substrate is bonded thereto with an adhesive placed between the light-emitting unit and the counter substrate, thus producing a flat panel.

Figure 13:
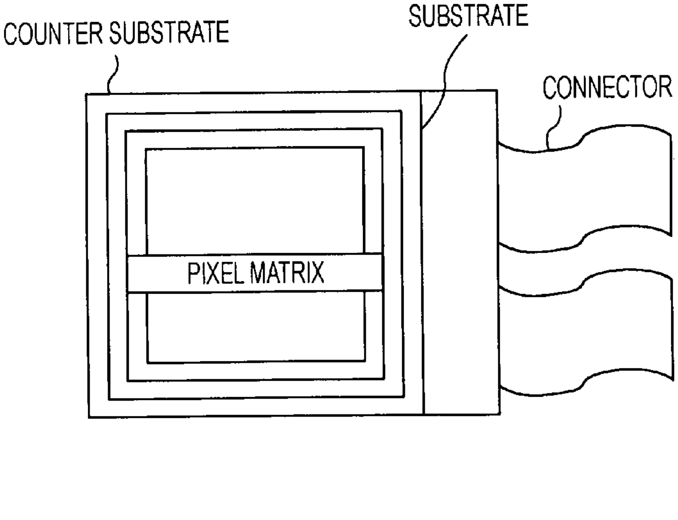
FIG. 13 is a plan view illustrating a module configuration of a display device according to an embodiment of the present invention.

The display device according to an embodiment of the present invention may be a flat display module illustrated in FIG. 13. For example, the display module includes an insulating substrate on which a pixel array is disposed. The pixel array includes a matrix of pixels, each pixel having an organic EL element, a TFT, a thin-film capacitor, and the like. The display module is produced by attaching a transparent counter substrate, such as a glass substrate, to an adhesive placed around the perimeter of the pixel array (pixel matrix). If necessary, the transparent counter substrate may be provided with a color filter, a protective film, a light-shielding film, and the like. At the same time, the display module may be provided with a connector, such as a flexible printed circuit (FPC), for transmission of signals or the like between the pixel array and external devices.

The display device according to the above-described embodiments of the present invention is a flat panel display device that can be used as a display for various types of electronic apparatuses (for example, digital cameras, notebook personal computers, mobile phones, and video camcorders) capable of displaying externally input or internally generated drive signals as an image or video. Hereinafter, examples of such electronic apparatuses will be described.

Figure 14:
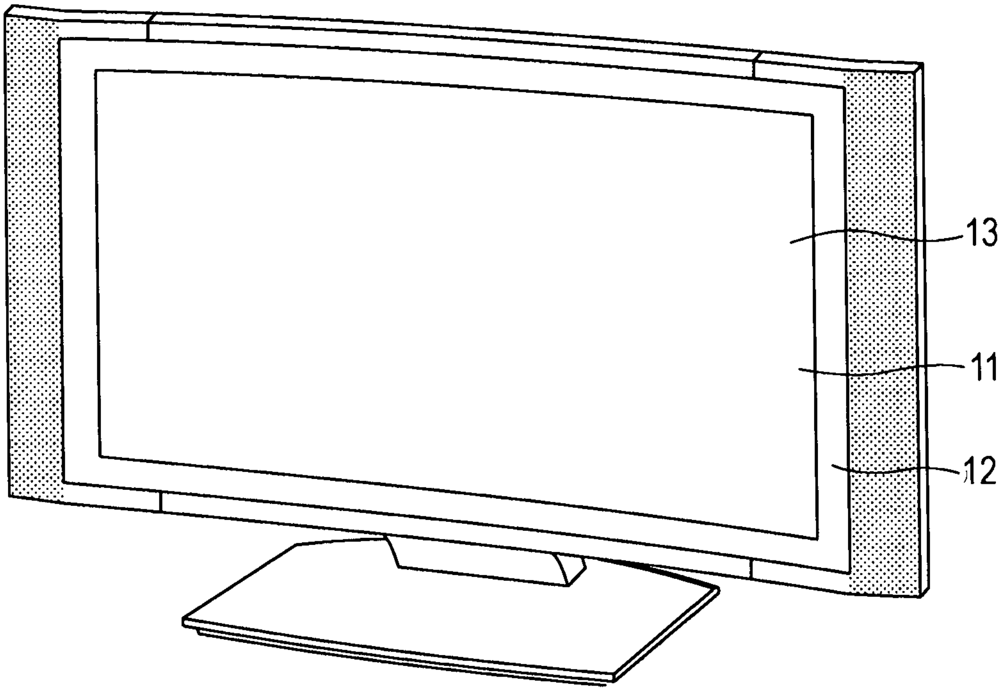
FIG. 14 is a perspective view illustrating a television set including a display device according to an embodiment of the present invention.

FIG. 14 illustrates a television to which the present invention is applied. The television includes an image display screen 11 composed of a front panel 12, a glass filter 13, and the like. The television of FIG. 14 is realized by using a display device according to an embodiment of the present invention as the image display screen 11.

Figure 15:
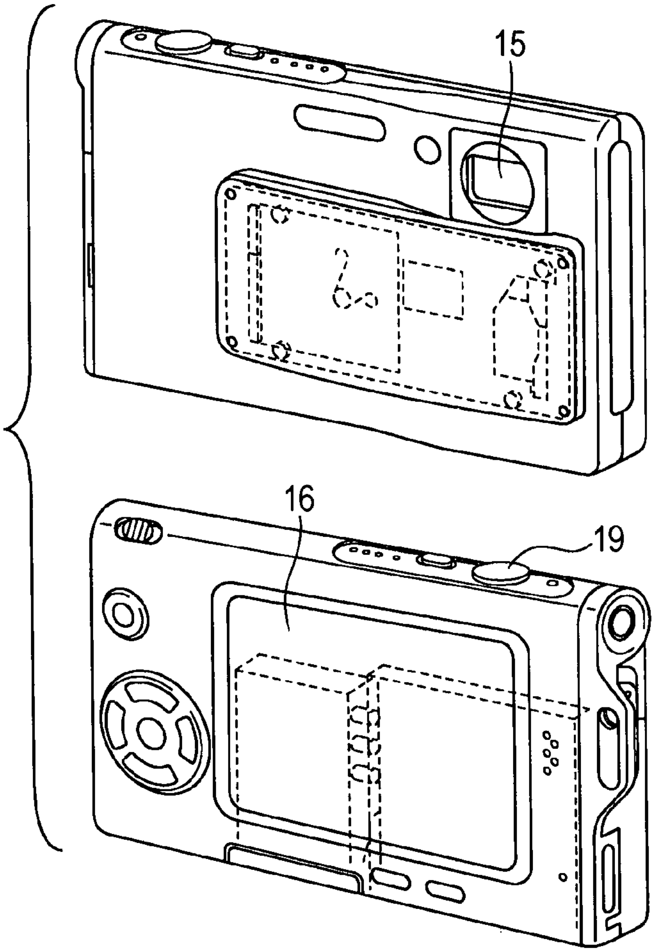
FIG. 15 is a perspective view illustrating a digital still camera including a display device according to an embodiment of the present invention.

FIG. 15 illustrates a digital camera to which the present invention is applied. The front and rear surfaces of the digital camera are presented in the upper and lower parts, respectively, of FIG. 15. The digital camera includes an image pickup lens, a light-emitting unit 15 serving as a flash, a display unit 16, a control switch, a menu switch, and a shutter 19. The digital camera of FIG. 15 is realized by using a display device according to an embodiment of the present invention as the display unit 16.

Figure 16:
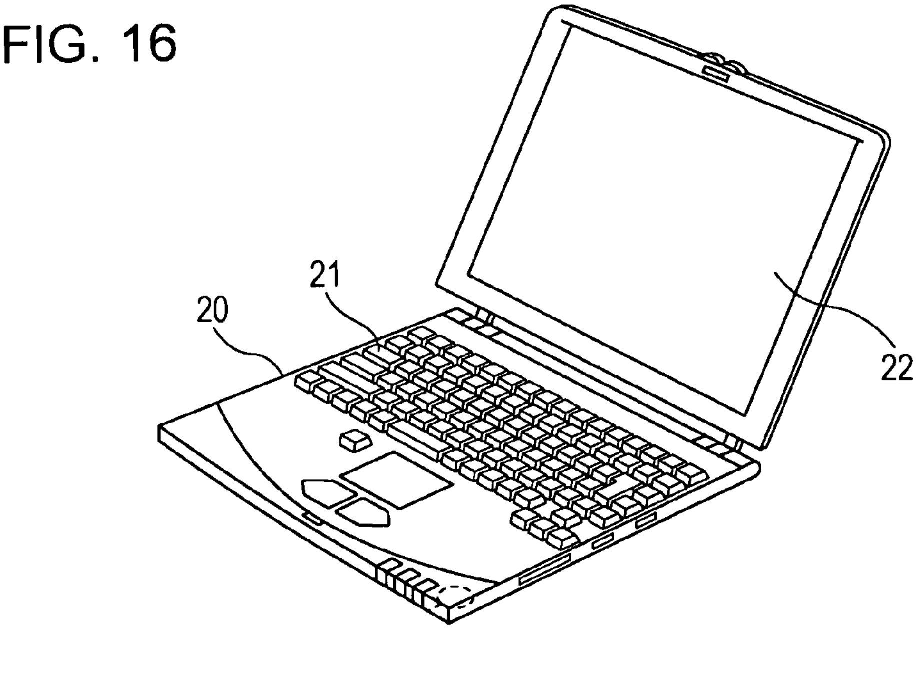
FIG. 16 is a perspective view illustrating a notebook personal computer including a display device according to an embodiment of the present invention.

FIG. 16 illustrates a notebook personal computer to which the present invention is applied. A main body 20 of the notebook personal computer includes a keyboard for entering text and the like. A cover for the main body 20 includes a display unit 22 for displaying images. The notebook personal computer of FIG. 16 is realized by using a display device according to an embodiment of the present invention as the display unit 22.

Figure 17:
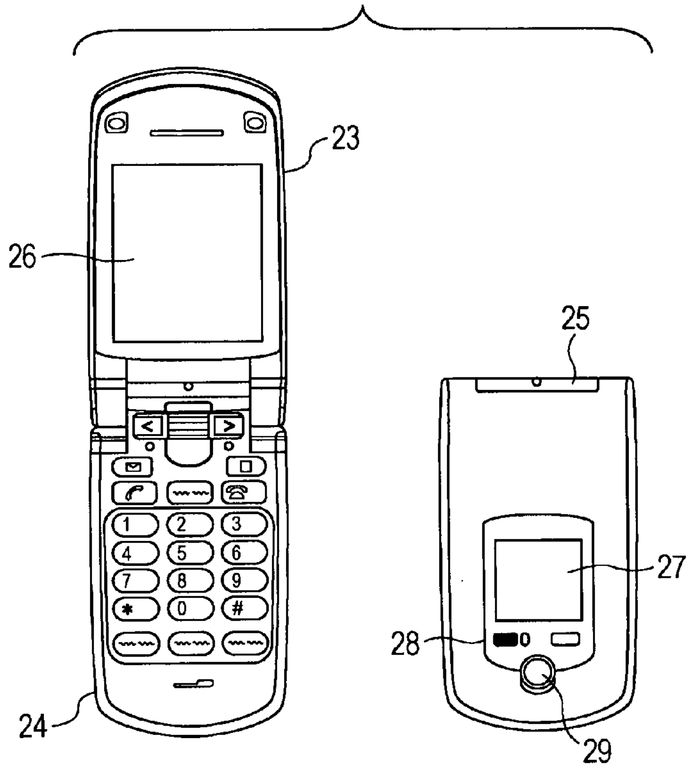
FIG. 17 is a diagram illustrating a mobile terminal apparatus including a display device according to an embodiment of the present invention.

FIG. 17 illustrates a mobile terminal apparatus to which the present invention is applied. An open state and a folded state of the mobile terminal apparatus are presented in the left and right parts, respectively, of FIG. 17. The mobile terminal apparatus includes an upper housing 23, a lower housing 24, a joint 25 (hinge), a display 26, a sub-display 27, a picture light 28, and a camera 29. The mobile terminal apparatus of FIG. 17 is realized by using a display device according to an embodiment of the present invention as the display 26 and/or the sub-display 27.

Figure 18:
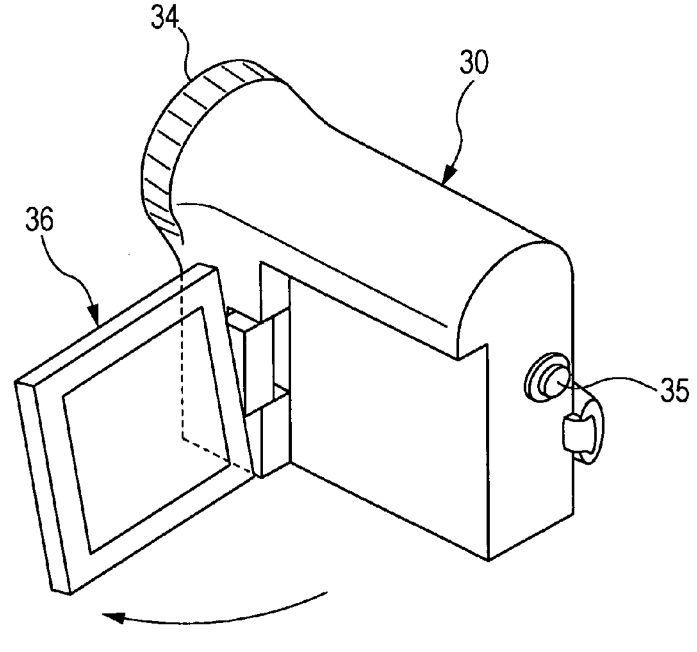
FIG. 18 is a perspective view illustrating a video camcorder including a display device according to an embodiment of the present invention.

FIG. 18 illustrates a video camcorder to which the present invention is applied. The video camcorder includes a main body 30, a lens 34 provided on the front side of the main body 30 and used for shooting a subject, a start/stop switch 35 for starting or stopping the shooting operation, and a monitor 36. The video camcorder of FIG. 18 is realized by using a display device according to an embodiment of the present invention as the monitor 36.

It should be understood by those skilled in the art that various modifications, combinations, sub-combinations and alterations may occur depending on design requirements and other factors insofar as they are within the scope of the appended claims or the equivalents thereof.

What is claimed is:

1. A display device comprising:

a pixel array, and a drive unit configured to drive the pixel array;

wherein the pixel array includes a plurality of first scanning lines and second scanning lines arranged in rows, a plurality of signal lines arranged in columns, a matrix of pixels arranged at respective intersections of the scanning lines and the signal lines, a plurality of power supply lines that supply power to each of the pixels, and a plurality of ground lines;

wherein the drive unit includes a first scanner that sequentially supplies first control signals to the corresponding first scanning lines so as to perform line-sequential scanning on the pixels on a row-by-row basis, a second scanner that sequentially supplies second control signals to the corresponding second scanning lines in synchronization with the line-sequential scanning, and a signal selector that supplies video signals to the columns of signal lines in synchronization with the line-sequential scanning;

wherein each of the pixels includes a light-emitting element, a sampling transistor, a drive transistor, a switching transistor, and a pixel capacitor;

wherein each of the pixels is configured such that:

a gate of the sampling transistor is connected to one of the first scanning lines, a source of the sampling transistor is connected to one of the signal lines, and a drain of the sampling transistor is connected to a gate of the drive transistor, the drive transistor and the light-emitting element are connected in series between one of the power supply lines and one of the ground lines to form a current path, the switching transistor is disposed in the current path and a gate of the switching transistor is connected to one of the second scanning lines, the pixel capacitor is disposed between the source and gate of the drive transistor, the sampling transistor is turned on in response to a first control signal supplied from the first scanning line, samples a signal potential of a video signal supplied from the signal line, and stores the sampled signal potential in the pixel capacitor, the switching transistor is turned on in response to a second control signal supplied from the second scanning line and brings the current path into conduction, and the drive transistor causes, when in a state of conduction, a drive current to flow into the light-emitting element through the current path, the drive current depending on the signal potential stored in the pixel capacitor; and wherein the drive unit is configured to drive each pixel such that:

the first scanner applies the first control signal to the first scanning line, thereby turning on the sampling transistor and sampling a signal potential, and then cancels the first control signal applied to the first scanning line so as to turn off the sampling transistor, the period when the sampling transistor is on defining a video signal writing period, prior to the video signal writing period, during a threshold correction period in which a threshold correction function is performed, the second scanner applies a first instance of the second control signal to the second scanning line, turning on the switching transistor, and then cancels the first instance of the second control signal prior to the beginning of the video signal writing period, and during a video signal writing period, the second scanner applies a second instance of the second control signal to the second scanning line, thereby turning the switching transistor on for a limited correction period and adjusting the signal potential stored in the pixel capacitor, and then cancels the second instance of the second control signal prior to the end of the video signal writing period.

2. The display device according to claim 1, wherein after the sampling transistor is turned off and the video signal writing period ends, and before the beginning of a next frame, the second scanner applies a third instance of the control signal to the second scanning line, thereby turning the switching transistor on for a predetermined light-emitting period, bringing the current path into conduction, and causing a drive current to flow into the light-emitting element; and the third instance of the control signal is canceled at the end of the light emitting period.

3. A driving method for a display device including a pixel array, and a drive unit configured to drive the pixel array;

wherein the pixel array includes a plurality of first scanning lines and second scanning lines arranged in rows, a plurality of signal lines arranged in columns, a matrix of pixels arranged at respective intersections of the scanning lines and the signal lines, a plurality of power supply lines that supply power to each of the pixels, and a plurality of ground lines;

wherein the drive unit includes a first scanner that sequentially supplies first control signals to the corresponding first scanning lines so as to perform line-sequential scanning on the pixels on a row-by-row basis, a second scanner that sequentially supplies second control signals to the corresponding second scanning lines in synchronization with the line-sequential scanning, and a signal selector that supplies video signals to the columns of signal lines in synchronization with the line-sequential scanning;

wherein each of the pixels includes a light-emitting element, a sampling transistor, a drive transistor, a switching transistor, and a pixel capacitor; and wherein each of the pixels is configured such that:

a gate of the sampling transistor is connected to one of the first scanning lines, a source of the sampling transistor is connected to one of the signal lines, and a drain of the sampling transistor is connected to a gate of the drive transistor, the drive transistor and the light-emitting element are connected in series between one of the power supply lines and one of the ground lines to form a current path, the switching transistor is disposed in the current path and a gate of the switching transistor is connected to one of the second scanning lines, the pixel capacitor is disposed between the source and gate of the drive transistor, the sampling transistor is turned on in response to a first control signal supplied from the first scanning line, samples a signal potential of a video signal supplied from the signal line, and stores the sampled signal potential in the pixel capacitor, the switching transistor is turned on in response to a second control signal supplied from the second scanning line thereby bringing the current path into conduction, and the drive transistor causes, when in a state of conduction, a drive current to flow into the light-emitting element through the current path, the drive current depending on the signal potential stored in the pixel capacitor;

the driving method comprising performing, for each pixel, the sequential steps of:

applying a first instance of the second control signal to the second scanning line and thereby turning the switching transistor on and correcting a threshold value of the drive transistor, canceling the first instance of the second control signal, thereby turning off the switching transistor, applying the first control signal to the first scanning line, thereby turning on the sampling transistor and sampling a signal potential, applying a second instance of the second control signal to the second scanning line, thereby turning the switching transistor on for a limited correction period, and adjusting the signal potential stored in the pixel capacitor, canceling the second instance of the second control signal, thereby turning off the switching transistor, and canceling the first control signal applied to the first scanning line, thereby turning off the sampling transistor.

4. An electronic apparatus comprising the display device according to claim 1.

5. The driving method for a display device according to claim 3, further comprising the steps of:

applying a third instance of the second control signal to the second scanning line after the first control signal is canceled and the sampling transistor is turned off and before the beginning of a next frame, thereby turning the switching transistor on for a predetermined light-emitting period, bringing the current path into conduction, and causing a drive current to flow into the light-emitting element;

canceling the third instance of the second control signal at the end of the predetermined light-emitting period.

6. The electronic apparatus according to claim 4, wherein after the sampling transistor is turned off and the video signal writing period ends, and before the beginning of a next frame, the second scanner applies a third instance of the second control signal to the second scanning line, thereby turning the switching transistor on for a predetermined light-emitting period, bringing the current path into conduction, and causing a drive current to flow into the light-emitting element; and the third instance of the control signal is canceled at the end of the light emitting period.

7. The display device according to claim 1, wherein the second instance of the second control signal is applied after the beginning of the video signal writing period and is canceled before the end of the video signal writing period such that a duration of the limited correction period is not affected by a transient response characteristic of the first scanning line, and variation in the duration of the limited correction period across pixels is suppressed.

8. The driving method for a display device according to claim 3, wherein the second instance of the second control signal is applied after the beginning of the video signal writing period and is canceled before the end of the video signal writing period such that a duration of the limited correction period is not affected by a transient response characteristic of the first scanning line, and variation in the duration of the limited correction period across pixels is suppressed.

9. The electronic apparatus according to claim 4, wherein the second instance of the second control signal is applied after the beginning of the video signal writing period and is canceled before the end of the video signal writing period such that a duration of the limited correction period is not affected by a transient response characteristic of the first scanning line, and variation in the duration of the limited correction period across pixels is suppressed.

* * * * *